Feb. 10, 1942. C. POLCARI 2,272,351
FAUCET
Filed July 8, 1941

Inventor
Carmine Polcari
By L. B. James
Attorney

Patented Feb. 10, 1942

2,272,351

UNITED STATES PATENT OFFICE 2,272,351

FAUCET

Carmine Polcari, Boston, Mass.

Application July 8, 1941, Serial No. 401,505

2 Claims. (Cl. 251—27)

This invention relates to water distribution and more particularly valves and faucets.

The primary object of this invention resides in constructing faucets and valves so as to obviate leakage of water or the like therethrough when closed.

Another object of this invention resides in constructing faucets and valves with dual seats and washers to provide leak proof joints in the communicating ports thereof.

A further object of this invention resides in the provision of a faucet or valve of such construction that sticking of the washers thereof on their seats will be obviated.

A still further object of this invention resides in the provision of a faucet or valve of such construction that the same can be easily opened with practically no effort.

Aside from the aforesaid objects this invention resides in the particular construction of the dual valve seats of the faucet.

In addition to the foregoing objects this invention resides in the particular construction of the washers.

Among the many objects of this invention is the particular construction of the auxiliary washer and its seat.

With these and other objects in view this invention resides in certain novel features of construction and arrangement of elements to be hereinafter more fully set forth in the specification, illustrated in the accompanying drawing and pointed out in the appended claims and, while this disclosure depicts my present conception of the invention, the right is reserved to resort to such changes in construction and arrangement of elements as come within the spirit of the invention.

In the accompanying drawing forming a part of this application;

Figure 1:
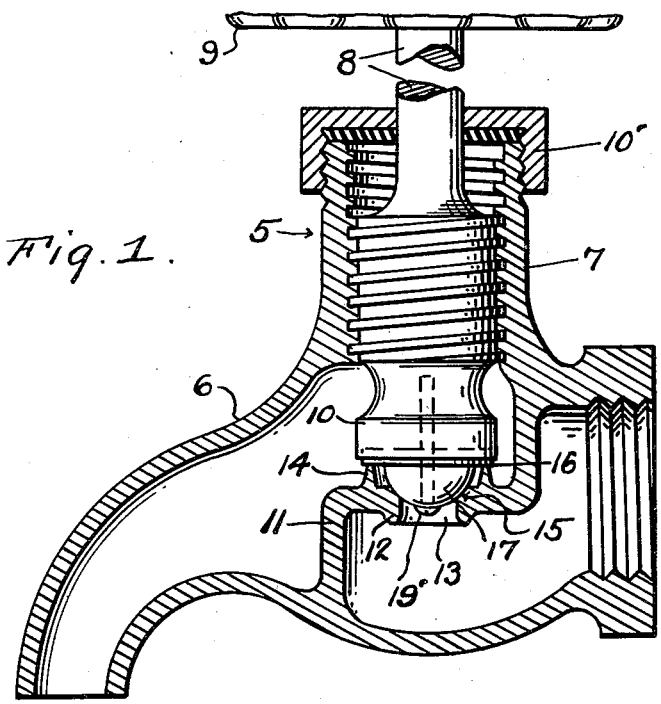
Fig. 1 is a longitudinal sectional view through a faucet as constructed in accordance with this invention.
Figure 2:
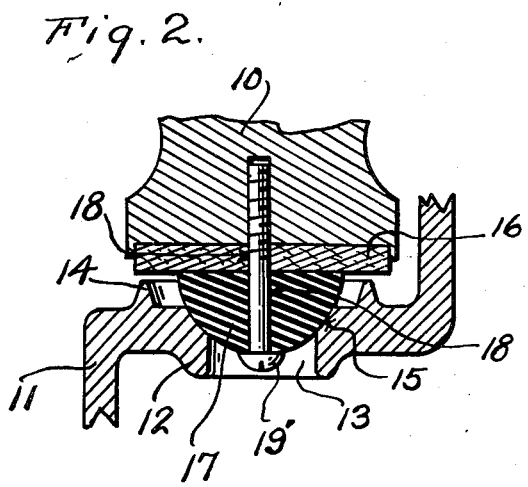
Fig. 2 is an enlarged sectional view through the seat and washer carrying end of the faucet handle.
Figure 3:
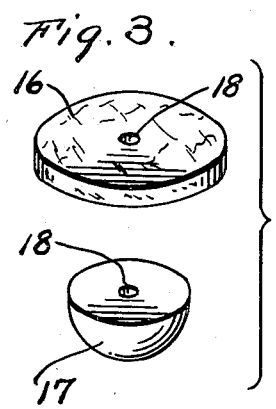
Fig. 3 is a detail perspective view of the washers in juxtaposition.

In the present illustration of this invention the numeral 5 designates, in general, a faucet consisting of a body portion 6 provided with an internally threaded neck 7 adapted to receive an exteriorly threaded valve stem 8 having a suitable handle 9 on its outer end and an inverted cup-shape head 10 on its inner end, said handle is surrounded by a suitable packing gland 10' screwed on the free end of the neck 7 to prevent leakage of water therearound.

Integrally formed within the faucet is a partition 11 of the usual or any approved type used in faucets or valves, however, the same in the instant case is materially thickened as indicated by the numeral 12 and provided with a port 13 surrounded by an annular upstanding valve seat 14 adjacent which is a concentrically disposed semi-spherical valve seat 15 formed in the upper surface of the thickened portion 12 of the partition 11.

Seated within the cup-shape portion of the head 10 is a disk shape washer 16 of a diameter greater than that of the annular valve seat 14 while secured thereagainst and projecting inwardly therefrom is a semi-spherical shape auxiliary washer 17, said washers being provided with centrally disposed apertures 18 through which a screw 19' is passed and threadedly engaged in a threaded recess in the head of the valve stem.

The washer 16 is formed from material somewhat harder than that from which the washer 17 is made to permit successive seating thereof, the latter of which contacts the seat 15 a slight degree in advance of the former to cause it to compress and exert upward pressure against its seat when the washers are fully seated and the faucet is closed, therefore with the washers so constructed and disposed on their seats, sticking thereof is obviated and quick and easy manipulation of the handle is permitted to open the faucet.

While this disclosure embodies elements manufactured and assembled in the form of a new and unused faucet, it is to be understood those faucets or valves now on the market or in use can be readily altered by simply reaming semi-spherical seats within the bases of the conventional or annular seats thereof and disposing auxiliary washers of the present type on the inner ends of the valve stems in a manner similar to that herein practiced.

With this invention fully set forth, it is manifest that means are provided whereby faucets and valves are prevented from leaking when closed and, through the simplicity of construction of the valve seats and washers, the cost of manufacture thereof is sufficiently reasonable to permit sale of the faucets and valves at no extra cost.

Having thus described my invention what I claim and desire to protect by Letters Patent is:

1. A faucet including a partition having upper and lower valve seats, a valve stem threadedly carried by the faucet in axial alignment with the valve seats, a fibrous washer carried at the inner end of the valve stem in opposed relation to the upper valve seat, a semi-spherical auxiliary rubber washer of lesser diameter at its base than the diameter of the fibrous washer bearing against the inner face of said fibrous washer and extending inwardly therefrom in opposed relation to the lower valve seat, said rubber washer being disposed relative to the fibrous washer for engagement with its seat in advance of seating of the fibrous washer.

2. A faucet including a partition having a port therein, a valve seat formed around the upper edge of the port, an annular flange of considerable greater diameter than the aforesaid valve seat formed on the partition and surrounding said valve seat to form a second valve seat adjacent thereto, a valve stem threadedly carried by the faucet in axial alignment with the valve seats, a disk washer of fibrous material carried by the inner end of the valve stem adapted to rest on said second valve seat when closed, an auxiliary rubber washer bearing against the fibrous washer and extending inwardly therefrom in opposed relation to the first mentioned valve seat, a screw securing the washers to the inner end of the valve stem, said auxiliary washer being disposed to engage its seat in advance of the fibrous washer engaging its seat and expand laterally above its seat into the space within the annular flange.

CARMINE POLCARI.